Aug. 25, 1931.    R. C. SMALLEY    1,820,838
SUPPORT FOR VACUUM TUBE LAMPS
Filed March 8, 1927
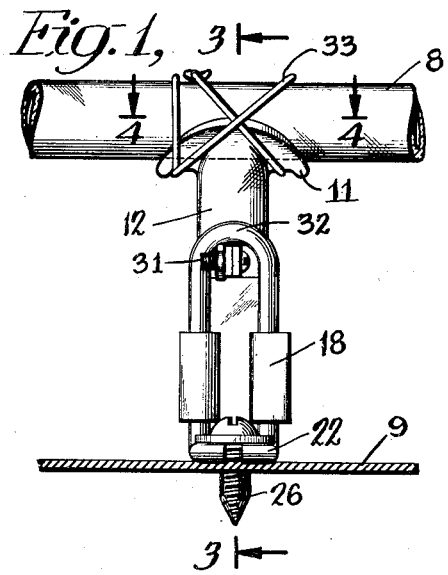
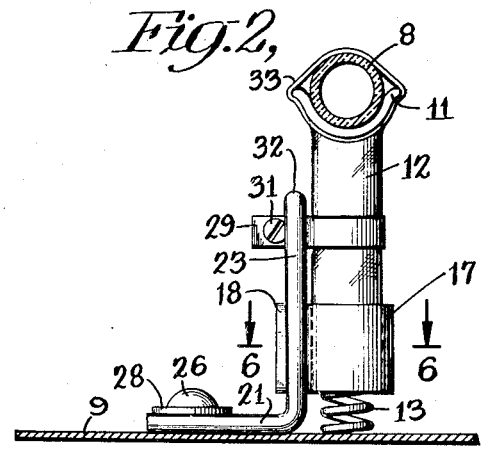
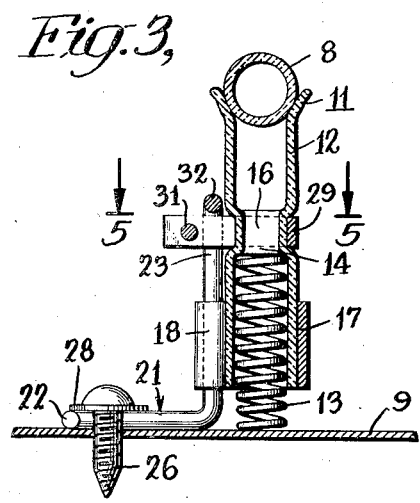
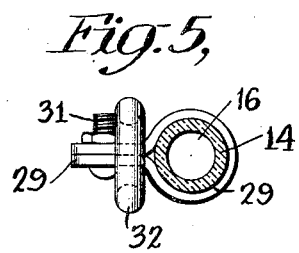
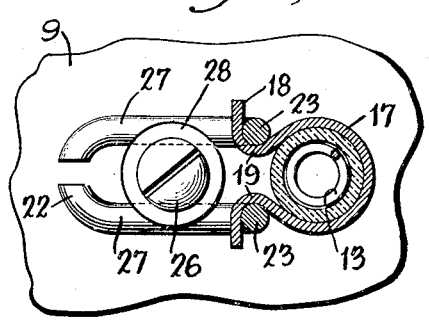
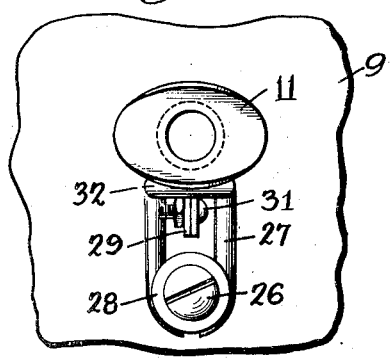
Inventor
ROBERT C SMALLEY.
By his Attorneys
Bohleber + Leadbetter.

Patented Aug. 25, 1931

1,820,838

UNITED STATES PATENT OFFICE

ROBERT C. SMALLEY, OF ARLINGTON, NEW JERSEY, ASSIGNOR TO CLAUDE NEON LIGHTS, INC., OF NEW YORK, N. Y., A CORPORATION OF NEW YORK

SUPPORT FOR VACUUM TUBE LAMPS

Application filed March 8, 1927. Serial No. 173,641.

This invention relates to adjustable supports for vacuum tube lights, such as the well known neon lights, in which a column of more or less rarefied gas, such for example, as neon, is caused to glow and radiate light by the passage of an electric current therethrough.

Lamps of this type are widely used in advertising and generally are in the form of relatively long and frequently unusually shaped glass tubing. For instance, it is common to have the tubing bent into the shape of a word, a design or the like. As will be understood, such tubes are more or less fragile, and must be carefully handled and subjected to as little strain as possible. As these tubes are usually mounted upon a support or base which is frequently hung outdoors where both the lamp and the base are exposed to all kinds of weather, the tube must be positively and reliably mounted on the background, in a way which shall require as little attention as possible. At the same time, since neither the tube nor the base dimensions can be changed after completion, some adjustable means must be provided for supporting tubes from bases in cases where the tube or the base or both fail to conform to the calculated or designed dimensions. In other words, the supporting means must be capable of adjustability but at the same time, must be reliable and positive when once adjusted and set.

Frequently the support or base is formed of rather thin sheet metal of relatively large area which, to function adequately as a support, need not be reenforced to any great extent. This sheet of material, however, is subject to expansion and contraction upon such variations in temperature as would result say from the direct action of the sun's rays, falling thereon during portions of the day, thereby causing the sheet to buckle or warp to a greater or lesser degree depending upon conditions.

It is an object of this invention to provide a support for lights of the class described, which support shall be capable of adjustment in practically any direction to accommodate variations between portions of the tube and its supporting base although holding the tube positively and securely, while at the same time capable of adapting itself to variations or changes in the supporting surface, as from buckling or warping.

It is another object of the invention to provide a universal support for such lights which is adapted for use with all sizes and styles of lights, which is adjustable as above described, and which is automatically compensating for periodic variations in the support.

A still further object of this invention is to provide such a support for lights of this character which is relatively economical to construct and simple to assemble and install.

According to this invention, the support for mounting vacuum tube lights upon a base plate comprised of relatively flexible sheet material comprises a tube receiving element having associated therewith yielding means arranged to maintain the tube spaced from the base plate and means for adjustably securing the tube receiving element to said base plate. More specifically, a collar encircling the tube receiving element is formed with portions to receive a pair of arms carried with a part which is adjustably clamped to the base plate. The tube receiving element receives a coil spring engaging a shoulder inwardly thereof and serving to yieldingly support that element from the base plate. To limit the expansibility of the coil spring a stop is carried with the tube support for engagement by a limiting abutment carried with the arms.

These and other objects of the invention and the means for their attainment will be more apparent from the following detailed description taken in connection with the accompanying drawings illustrating a preferred embodiment thereof, in which:

Figure 1 is a view in side elevation of a portion of a lamp supported according to this invention.

Figure 2 is a similar view taken at right angles to Figure 1.

Figure 3 is a vertical sectional view taken on the line 3—3 of Figure 1.

Figure 4 is a view of the structure shown in Figure 1 looking from above and taken in the plane indicated by the line 4—4 in Figure 1 but with the tube removed.

Figure 5 is a fragmentary transverse view on the line 5—5 of Figure 3.

Figure 6 is a sectional view taken on the line 6—6 of Figure 2 showing one adjustment of the support.

The lamp tube 8 is supported according to this invention from a flexible base 9 which may be of relatively thin sheet metal which, it will be readily appreciated, will tend to buckle and warp under changes of temperature resulting from the direct application of the sun's rays falling thereon during parts of the day. The tube 8 is shown as resting upon the flared tube supporting portion 11 of a tubular spacing element 12 whereof the length is so designed as to terminate, in operative position, short of the base 9. The spacing element 12 is supported from the base through resilient spacing means shown as a coil spring 13 telescoped within the end of the tube 12 and positioned by a shoulder 14 formed by a constricted portion 16 in the tube 12 having also another function hereafter described.

There is also provided a collar 17 adapted to encircle the spacing element 12 to serve as a bearing therefor within which the tubular member 12 may reciprocate. The collar 12 is preferably formed of sheet metal bent substantially as shown in Figure 6 to an approximation of the Greek letter omega thereby providing spaced wings 18 defining arm receiving portions 19.

To cooperate with the collar 17 there is provided a bracket member 21 which is preferably formed by bending relatively heavy wire into substantially the form of a U with the free ends 22 bent inwardly to form in effect an oval having parallel sides. Thereafter the bracket member 21 is bent medially at right angles to form upwardly projecting, parallel arm portions 23 adapted to slidably engage the arm receiving portions 19 of the collar 17 so as to grip and support the same, the collar being preferably of sufficiently resilient material to expand to cause the portions 19 to grip and support themselves on the arms 23. The bracket member 21 may be secured to the base plate 9 by means of a bolt or screw 26 passing between the parallel members 27 of the bracket member 21 and if desired carrying a washer or plate 28 adapted to clamp and hold the base in position.

It will be recognized that the spring 13, having a normal tendency to expand and being in engagement with the shoulder 14, will tend normally to push the tubular support upwardly away from the base plate 9. To limit this upward projection the tubular member 12 carries a stop shown in this instance as a band 29 clamped about the tube 12 in the groove 16 by means of a bolt 31 and adapted to reciprocate between the upwardly directed arms 23 and to limit the upward movement of the tubular member by abutting against the loop end 32 of the bracket member 21.

In order to assemble a vacuum tube light to the base 9 the latter will be drilled to receive the screws or bolts 26 at as many places as it is desired to support a light. The supporting element comprising spacer 12, spring 13, collar 17, stop 29 and bracket 21 will be assembled as already described and bolted or clamped in its approximate position by the screw 26. Tie wires 33 are then passed one or more times around the lamp tube 8 and the flare 11. It will be understood that as many supports may be used as desired and the spacing may be that which is found to be best in the circumstances. After the light has been secured in position a final adjustment may be made of the supports by loosening the bolt 26 and sliding or rotating the various parts to bring the spacer 12 into the exact position desired after which the bolt 26 may be tightened.

Thereafter should the base 9 vary by buckling say under expansion or contraction of the metal, the change will not be transmitted to the lamp tube 8 but will be compensated for by compression or expansion of the spring 13 which will permit the tube to reciprocate in the bearing formed by the collar 17.

Various modifications may be made in the composition and configuration of the component elements going to make up the support as a whole without departing from the spirit and scope of the invention as set forth in the appended claims.

What I claim is:—

1. A support for mounting positive column tube lights upon a base plate, comprising a receiving element for a positive column tube, yielding means in contact with the base plate and arranged to maintain said tube spaced from said base plate, and means for adjustably securing said element to said base plate comprising a vertically slidable clamp.

2. A support for mounting positive column tube lights upon a base plate, comprising a receiving element for a positive column tube, yielding means in contact with the base plate and arranged to maintain said tube spaced from said base plate, and means universally adjustable for securing said element to said base plate.

3. A support for mounting positive column tube lights upon a base plate, comprising a receiving element for a positive column tube, yielding means in contact with the base plate and arranged to maintain said tube spaced from said base plate, and means including a collar adapted to be longitudinally slidable on said element for securing said element to said base plate.

4. A support for mounting positive column tube lights upon a base plate, comprising a receiving element for a positive column tube, yielding means in contact with the base plate and arranged to maintain said tube spaced from said base plate, a collar adapted to encircle said element, and means slidably adjustable on said collar for securing said element to said base plate.

5. A support for mounting positive column tube lights upon a base plate, comprising a receiving element for a positive column tube, yielding means in contact with the base plate and arranged to maintain said tube spaced from said base plate, a collar adapted to encircle said element, and means for securing said collar to said base plate, said means being slidably and rotatably adjustable with respect to said base.

6. A support for mounting vacuum tube lights upon a base plate, comprising a tube receiving element, yielding means arranged to maintain said tube spaced from said base plate, a collar adapted to encircle said element and slidably and rotatably adjustable thereon, and means for securing said collar to said base plate, said means being slidably and rotatably adjustable with respect to said base plate.

7. A support for mounting vacuum tube lights upon a base plate, comprising a tube receiving element having a tubular portion, a coil spring telescoping within the tubular portion and engaging the base plate, a spring collar adapted to encircle said element and a member having a pair of arms arranged for relative sliding engagement with said collar, and having a portion adapted to be fastened to said base plate.

8. A support for mounting vacuum tube lights upon a base plate, comprising a tube receiving element having a tubular portion, a coil spring telescoping within the tubular portion and engaging the base plate, a spring collar adapted to encircle said element and formed to define arm receiving portions, and a member having a pair of substantially parallel arms arranged for sliding engagement with the arm receiving portions of said collar, and having a portion adapted to be fastened to said base plate.

9. A support for mounting vacuum tube lights upon a base plate, comprising a tube receiving element having a tubular portion, a coil spring telescoping within the tubular portion and engaging the base plate, a collar adapted to encircle said element and having portions formed thereon to receive a pair of arms, and a member having a pair of substantially parallel arms adapted to receive and resiliently retain said collar therebetween, and having a portion adapted to be fastened to said base plate.

10. A support for mounting vacuum tube lights upon a base plate comprising a tube receiving element formed with a tubular end having a shoulder inwardly thereof, a coil spring telescoping within the tubular end and engaging the shoulder and the base plate, a collar adapted to encircle said element and having portions formed thereon to receive a pair of arms and a bracket member having a pair of substantially parallel arms adapted to receive and substantially sustain said collar therebetween, said bracket member comprising a wire bent to form two parallel sides having a closed end and bent medially thereof at an angle to form the arms.

11. A support for mounting vacuum tube lights upon a base plate comprising a tube receiving element formed with a tubular end having a shoulder inwardly thereof, a coil spring telescoping within the tubular end and engaging the shoulder and the base plate, a collar adapted to encircle said element and having portions formed thereon to receive a pair of arms and a bracket member having a pair of substantially parallel arms adapted to receive and substantially sustain said collar therebetween, said bracket member comprising a wire bent to form two parallel sides having a closed end and bent medially thereof at an angle to form the arms and a stop carried with the tubular member and reciprocable between the arms for engagement by the closed end.

12. A support for mounting vacuum tube lights upon a base plate comprising a tube receiving element formed with a tubular end having a shoulder inwardly thereof, a coil spring telescoping within the tubular end and engaging the shoulder and the base plate, a collar adapted to encircle said element and having portions formed thereon to receive a pair of arms and a bracket member having a pair of substantially parallel arms adapted to receive and substantially sustain said collar therebetween, said bracket member comprising a wire bent to form two parallel sides having a closed end and bent medially thereof at an angle to form the arms, and a stop carried with the tubular member and reciprocable between the arms, to engage the closed end and formed by a strap encircling the groove and clamped thereon.

13. A support for mounting positive column tubes upon a base plate comprising a receiving element for a positive column tube, means engaging the tube receiving element and securing the element to the base plate, and yielding means to maintain said tube spaced from the base plate.

14. A support for mounting positive column tubes upon a base plate comprising a receiving element for a positive column tube, adjustable means engaging the tube receiving element and securing the element to the base plate, and yielding means to maintain said tube spaced from the base plate.

In testimony whereof I affix my signature.

ROBERT C. SMALLEY.